United States Patent
Braun et al.

(10) Patent No.: US 6,269,804 B1
(45) Date of Patent: Aug. 7, 2001

(54) COAXIAL LIQUID COOLED FUEL RAIL ASSEMBLY

(75) Inventors: Charles Wilson Braun, Livonia; Peter E. Bartell, Fairport; Jeffrey Mark Noll, Honeoye Falls; Kern E. Haynes, Rush, all of NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/558,771

(22) Filed: Apr. 26, 2000

(51) Int. Cl.[7] .................................................. F02M 37/04
(52) U.S. Cl. ........................................ 123/541; 123/456
(58) Field of Search .................................. 123/541, 456, 123/41.31, 41.44

(56) References Cited

U.S. PATENT DOCUMENTS

| | | | |
|---|---|---|---|
| 2,994,311 | * | 8/1961 | Shuck ..................................... 123/541 |
| 4,848,283 | * | 7/1989 | Garms et al. ......................... 123/541 |
| 5,423,303 | * | 6/1995 | Bennett ................................ 123/541 |
| 5,803,050 | * | 9/1998 | Osakabe et al. ..................... 123/541 |
| 6,189,508 | * | 2/2001 | Stan ..................................... 123/541 |

FOREIGN PATENT DOCUMENTS

3735915 * 5/1989 (DE) ...................................... 123/541

* cited by examiner

Primary Examiner—Marguerite McMahon
(74) Attorney, Agent, or Firm—John A. Van Ophem

(57) ABSTRACT

A liquid cooled fuel rail assembly includes an elongate tubular fuel conduit having a longitudinal central axis and a first diameter. The fuel conduit is configured for carrying fuel and defines at least one port, each port being configured to receive an intake end of a corresponding fuel injector. A first end plug is associated with a first end of the fuel conduit and defines a first bore and a second bore therethrough. The first end plug seals the first end of the fuel conduit. A second end plug is associated with a second end of the fuel conduit and defines a first bore and a second bore therethrough. The second end plug seals the second end of the fuel conduit. A fuel inlet is in fluid communication with the second bore of the first end plug. A fuel outlet is in fluid communication with the second bore of the second end plug. An elongate tubular coolant conduit has a second outside diameter that is less than the first outside diameter of the fuel conduit. A first segment of the coolant conduit is disposed entirely within and surrounded by the fuel conduit. The coolant conduit extends through the first bore of the first end plug and through the first bore of the second end plug. The coolant conduit is configured for carrying coolant.

31 Claims, 2 Drawing Sheets

COAXIAL LIQUID COOLED FUEL RAIL ASSEMBLY

TECHNICAL FIELD

The present invention relates to internal combustion engines and, more particularly, to fuel rail assemblies for fuel-injected internal combustion engines.

BACKGROUND OF THE INVENTION

Fuel injected engines have gained favor with automotive manufacturers and the general public due to their superior performance, lower level of undesirable emissions, and increased fuel efficiency relative to conventional carbureted engines. Furthermore, fuel injection provides the ability to more accurately control a variety of engine operating parameters via an on-board electronic control unit. In fuel injected engines, fuel is typically supplied to the injectors through one or more rigid conduits, or fuel rails. Fuel is supplied to a fuel rail through a fuel inlet which is integral with or in communication with the fuel rail. A fuel rail is typically adapted to receive fuel injectors at locations, or ports, spaced at intervals along its length. The locations, or spacing, of the ports and fuel injectors are chosen so as to be in alignment with the corresponding intake ports of a particular internal combustion engine with which the fuel rail is intended to be used.

Many fuel injection systems, such as, for example, those used on marine engines, incorporate a vapor separator which receives fuel pumped from the fuel tank at low pressure from an engine driven mechanical lift pump. A high pressure electric fuel pump is provided, either integral with or separate from the vapor separator, to increase the pressure of the fuel to the level required by the fuel injection system prior to entering the fuel rail. The pressurized fuel is delivered to the fuel injectors by the fuel rail. Typically, the high pressure fuel lines are restricted to the area adjacent to the engine. In an outboard motor, any fuel leaking from the high pressure fuel lines adjacent to the engine drains into and is diluted by the body of water in which the boat and engine are located, rather than accumulating in the hull of the boat and creating a fire hazard. Leaks of fuel from inboard motors having this type of fuel system architecture are confined to the engine compartment.

The high pressure fuel pump and the engine itself each dissipate power in the form of heat. The heat can bring the low-pressure fuel in the vapor separator to its boiling point and cause the fuel to vaporize. When this occurs, the high pressure pump becomes starved of fuel. This causes rough engine operation and stalling of the engine. Cooling of the vapor separator or the high pressure return fuel line counteracts, to a degree, the accumulation of heat and the resulting vaporization of the fuel. However, despite the cooling of the vapor separator and/or high pressure pump, heat from the engine and other surrounding components is absorbed by the fuel rail.

Water cooled fuel rails are used to, at least partially, remove the heat absorbed by the fuel rail from its ambient environment. Water cooled fuel rails, such as those used in marine engines, typically draw cooling water from the body of water in which the boat or engine is operating. The cooling water is circulated through a coolant conduit associated with the fuel rail. The fuel rail includes a fuel conduit which is adjacent to the coolant conduit and carries the fuel. The two conduits are typically separated by and share an inner wall. Such fuel rails are typically machined aluminum extrusions that are anodized for protection against the corrosive effects of the cooling water.

However, the extruded design dictates the walls of the fuel rail also be aluminum, which promotes unwanted heat transfer between the fuel rail and its ambient environment. Aluminum conducts heat 500 times faster than certain composite materials and about 10 times faster than stainless steel. The parallel configuration of the conduits in the extruded design results in the outer surface of the coolant conduit being exposed to the ambient environment which is heated by the engine and surrounding components. Thus, heat from the engine and other components is readily absorbed by the thermally conductive aluminum fuel rail, thereby creating inefficiency in the cooling of the fuel rail.

To form the rail, the extruded blank requires extensive machining during which a substantial portion of the blank material is removed thereby resulting in wasted raw material. Features, such as injector ports, mounting holes, and interfaces for the fuel inlet, fuel outlet, coolant inlet and coolant outlet, also must be machined into the blank. Other features, such as bolt flanges, are formed of a thick section of aluminum that extends the entire length of the fuel rail which adds undesirable mass and thermal inefficiencies to the rail. Such added mass can be machined away, but that process adds to the time and expense involved in manufacturing extruded fuel rails and the amount of raw material which is wasted.

The parallel conduits within the fuel rail share a common wall which separates the conduits, and through which most of the heat transfer or cooling occurs. As water is circulated through the coolant conduit, it contacts and removes heat from the wall shared by and separating the conduits. Thus, the surface area available for the transfer of heat away from the rail is limited to the surface area of that one common wall. Furthermore, the extrusion process dictates a minimum wall thickness of about 3 mm. Thus, the common wall separating the coolant conduit from the fuel conduit can be no thinner than about 3 mm. Heat transfer is inversely proportional to thickness. Thus, the relatively thick common cooling wall and the decreased thermal conductivity thereof makes cooling the rail even more inefficient.

The process of extruding rails typically requires large machine complexes in order to obtain efficiency. Thus, a large investment in equipment is required, and such equipment must be dedicated to a particular fuel rail design. The machines make the implementation of a change in the design of the fuel rail or the production of a new fuel rail time consuming, expensive and difficult, and typically requires retooling. Once a change is implemented, it may be impossible to produce a previous fuel rail model without reversing those difficult and expensive changes. Furthermore, the aluminum blank must typically be sent to an outside contractor for anodization, thereby adding further time and expense to the manufacture of such fuel rails.

The extrusion process also limits the flow area, or cross-sectional area, of the fuel conduit. The mass of an extruded fuel rail is directly proportional to its cross-sectional area. The larger the cross-sectional area, the greater the mass of an extruded rail. An increase in mass adversely affects the thermal characteristics of a fuel rail. Thus, the cross-sectional area of an extruded rail is limited by the adverse thermal consequences a particular design can incur. A fuel conduit with a larger cross section offers advantages in fluid dynamics. Dynamic pressure pulsations within a fuel conduit result from the operation of the fuel injectors connected to the fuel conduit. The activation of a fuel injector causes a rapid change in the fuel flow rate through the conduit. The rapid change in fuel velocity sends a pressure wave through the fuel conduit. The change in fuel velocity is inversely proportional to the flow area, or cross sectional area, of the fuel conduit. This phenomenon is analogous to the pressure wave in a water pipe when a faucet is suddenly turned on or off. The pressure wave within a fuel conduit adversely affects the operation of the fuel injectors being supplied by the conduit, and can cause rough engine operation, stalling, an increase in undesirable emissions and objectionable noise. Thus, fuel dynamics are adversely affected by the limit placed on the cross-sectional area of an extruded fuel conduit.

Therefore, what is needed in the art is a liquid cooled fuel rail assembly which utilizes thermally dissimilar materials that do not readily absorb heat from the ambient environment into the fuel rail assembly, and yet provides efficient heat transfer from the fuel conduit to the coolant conduit. These materials should permit a reduction in the overall mass of the fuel rail assembly to thereby further promote efficient heat transfer.

Furthermore, what is needed in the art is a liquid cooled fuel rail assembly which maximizes the surface area through which heat is transferred from the fuel conduit to the coolant conduit.

Moreover, what is needed in the art is a liquid cooled fuel rail assembly which allows the use of a thin separating wall between the coolant and fuel conduits, thereby minimizing the thermal resistance between the two conduits.

Yet further, what is needed in the art is a liquid cooled fuel rail assembly which can have an enlarged flow area, or cross sectional area, thereby decreasing the adverse effects of the pressure wave created within the fuel conduit by the operation of the fuel injectors.

Even further, what is needed in the art is a liquid cooled fuel rail assembly which can be produced using more efficient, more flexible and less expensive manufacturing processes.

SUMMARY OF THE INVENTION

The present invention provides a coaxial liquid cooled fuel rail for use with fuel injected internal combustion engines.

The invention comprises, in one form thereof, a liquid cooled fuel rail assembly including an elongate tubular fuel conduit having a longitudinal central axis and a first diameter. The fuel conduit is configured for carrying fuel and defines a plurality of ports, each of which receive an intake end of a corresponding fuel injector. A first end plug is associated with a first end of the fuel conduit and defines a first bore and a second bore therethrough. The first end plug seals the first end of the fuel conduit. A second end plug is associated with a second end of the fuel conduit and defines a first bore and a second bore therethrough. The second end plug seals the second end of the fuel conduit. A fuel inlet is in fluid communication with the second bore of the first end plug. A fuel outlet is in fluid communication with the second bore of the second end plug. An elongate, tubular coolant conduit has a second outside diameter that is less than the first outside diameter of the fuel conduit. A first segment of the coolant conduit is disposed entirely within and surrounded by the fuel conduit. The coolant conduit extends through the first bore of the first end plug and through the first bore of the second end plug. The coolant conduit is configured for carrying coolant.

An advantage of the present invention is that a portion of the coolant conduit is disposed within and surrounded by the fuel conduit. Thus, the entire circumference of that portion of the coolant conduit serves as a heat transfer surface, thereby substantially increasing the surface area available to conduct heat out of the fuel rail.

Another advantage of the present invention is that the fuel rail and coolant conduit may be constructed of thermally dissimilar materials. Thus, the coolant conduit may be constructed of a thermally conductive material, thereby increasing the amount of heat transfer from the fuel to the coolant, and the fuel conduit may be made of a thermally resistive material, thereby decreasing the absorption of heat thereby from its ambient environment.

Yet another advantage of the present invention is that the wall of the coolant conduit may be made substantially thinner than the process of extrusion permits, thereby increasing the thermal conductivity of the coolant conduit and increasing the efficiency of heat transfer from the fuel to the coolant.

A still further advantage of the present invention is that the liquid cooled fuel rail will have a substantially reduced overall mass.

An even further advantage of the present invention is that the method of fabrication and assembly of the fuel rail is greatly simplified, more flexible, and much less costly.

Yet another advantage of the present invention is that the cross-sectional area of the fuel conduit may be made larger than that of an extruded rail without suffering an adverse impact upon the thermal characteristics, thereby gaining advantages in fluid dynamics in the form of a reduced pressure wave being created within the fuel conduit as a result of the operation of the fuel injectors.

BRIEF DESCRIPTION OF THE DRAWINGS

The above-mentioned and other features and advantages of this invention, and the manner of attaining them, will become apparent and be better understood by reference to the following description of one embodiment of the invention in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DESCRIPTION OF THE PREFERRED EMBODIMENT

Figure 1:
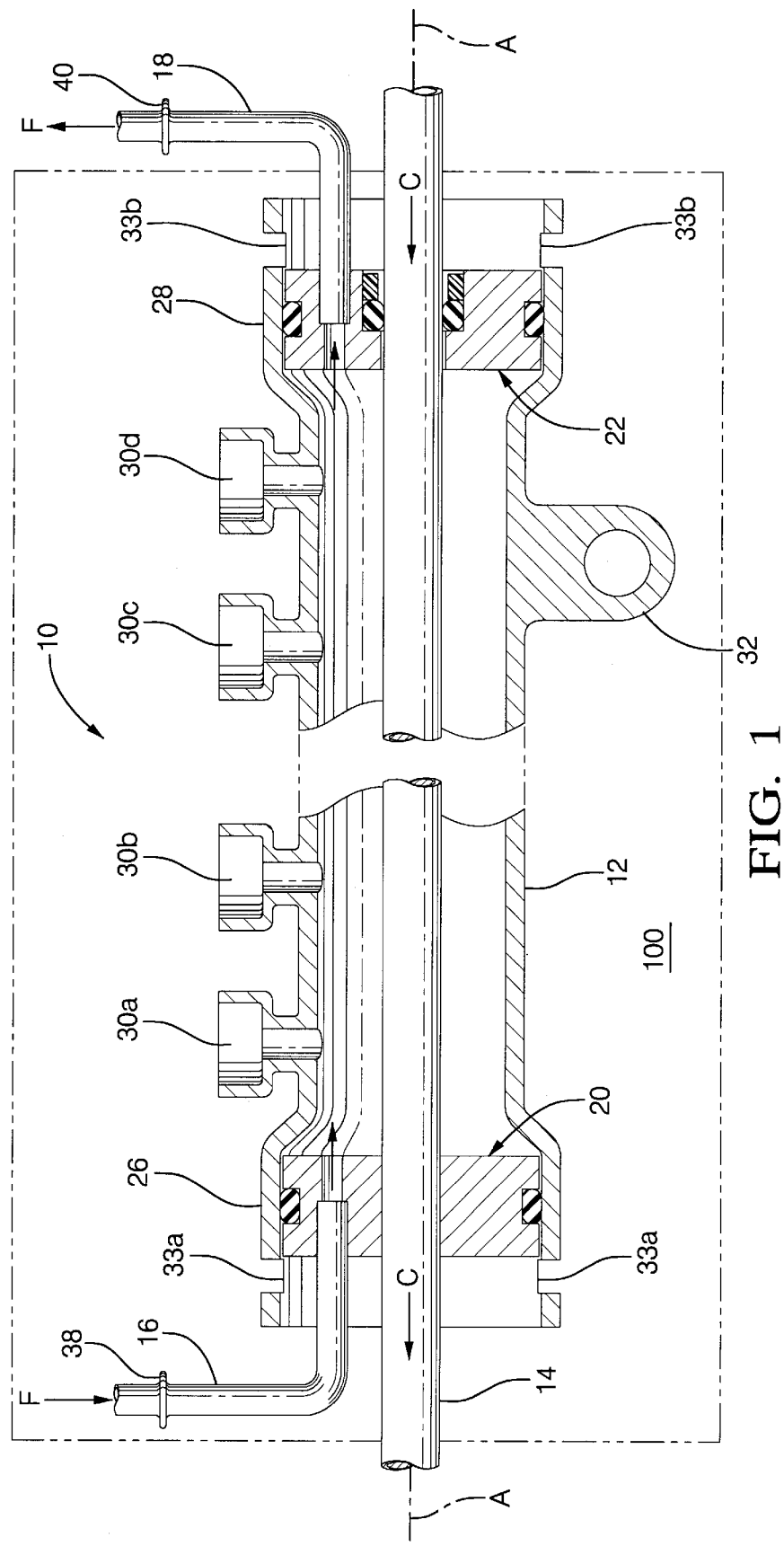
FIG. 1 is a cutaway view of one embodiment of a coaxial liquid cooled fuel rail assembly of the present invention.

Referring now to the figures and particularly to FIG. 1, there is shown one embodiment of a coaxial liquid cooled fuel rail assembly 10 of the present invention. Coaxial liquid cooled fuel rail assembly 10 includes fuel conduit 12, coolant conduit 14, fuel inlet 16, fuel outlet 18, inlet end plug assembly 20, outlet end plug assembly 22, and ports 30a, 30b, 30c, and 30d. Fuel conduit 12 and coolant conduit 14 are coaxial, with a portion of coolant conduit 14 passing through and being surrounded by fuel conduit 12.

Fuel conduit 12 is an elongate tubular member having a central axis A. Fuel conduit 12 is terminated at each end in widened or flange portions 26 and 28 which receive inlet end plug assembly 20 and outlet end plug assembly 22, respectively. Fuel conduit 12 defines injector ports 30a, 30b, 30c, and 30d thereon, each of which receive an intake end of a corresponding fuel injector (not shown). Mounting boss 32 is affixed to or formed integrally with fuel conduit 12, such as, for example, by molding. Fuel conduit 12 is constructed of, for example, stainless steel, which has a thermal conductivity of approximately 20 Watts per meter per degree Celsius. By contrast, aluminum extruded rails have a thermal conductivity of approximately 150 Watts per meter per degree Celsius. Thus, an aluminum extruded rail will absorb about seven times more heat than the coaxial liquid cooled fuel rail assembly constructed of stainless steel. Preferably, fuel conduit 12 is constructed of a material having a low thermal conductivity to reduce the amount of heat fuel conduit 12 absorbs from the ambient environment. For the purposes of this application, a low thermal conductivity is defined as less than approximately 30 Watts per meter per degree Celsius. Most preferably, fuel conduit 12 is molded from a synthetic material such as, for example, 33% glass filled nylon 66, which has a low thermal conductivity of approximately 0.2 Watts per meter per degree Celsius. Thus, the absorption of heat by fuel conduit 12 from its ambient environment is minimized. It is to be understood, however, that fuel conduit 12 can be constructed of other engineering polymers, such as, for example, a polyamide, a polyphthalamide, a polyphenylene sufide or a phenolic. Fuel conduit 12 is formed with slots 33a and 33b to receive a mechanical device such as, for example, a ring clamp, snap ring, crimp ring, or hair pin for purposes discussed hereinafter.

Coolant conduit 14 is an elongate tubular member which is coaxial with fuel conduit 12, and therefore shares central axis A with fuel conduit 12. Coolant conduit 14 is coaxial with and passes through fuel conduit 12. At each end of fuel conduit 12, coolant conduit 14 passes through a respective one of inlet end plug assembly 20 and outlet end plug assembly 22. Coolant conduit 14 has formed therein at its ends flanges 34 and 36 (FIGS. 2 and 3, respectively) which receive and retain an end of a cooling fluid supply tube and/or return tube (not shown). Coolant conduit 14 is constructed of, for example, thin-walled stainless steel, plated steel, or aluminum tubing. The thin-walled construction increases the efficiency of heat transfer between the fuel and the coolant, and the aluminum material offers high thermal conductivity.

Fuel inlet 16 is in fluid communication with fuel conduit 12. Flange 38 is formed on fuel inlet 16 to receive and retain an end of a fuel supply line (not shown). In the embodiment shown, fuel inlet 16 is formed separately from fuel conduit 12. However, it is to be understood that fuel inlet 16 can be formed integrally with fuel conduit 12.

Fuel outlet 18 is in fluid communication with fuel conduit 12. Flange 40 is formed on fuel outlet 18 to receive and retain an end of a fuel return line (not shown). In the embodiment shown, fuel outlet 18 is formed separately from fuel conduit 12. However, it is to be understood that fuel outlet 18 can be formed integrally with fuel conduit 12.

Figure 2:
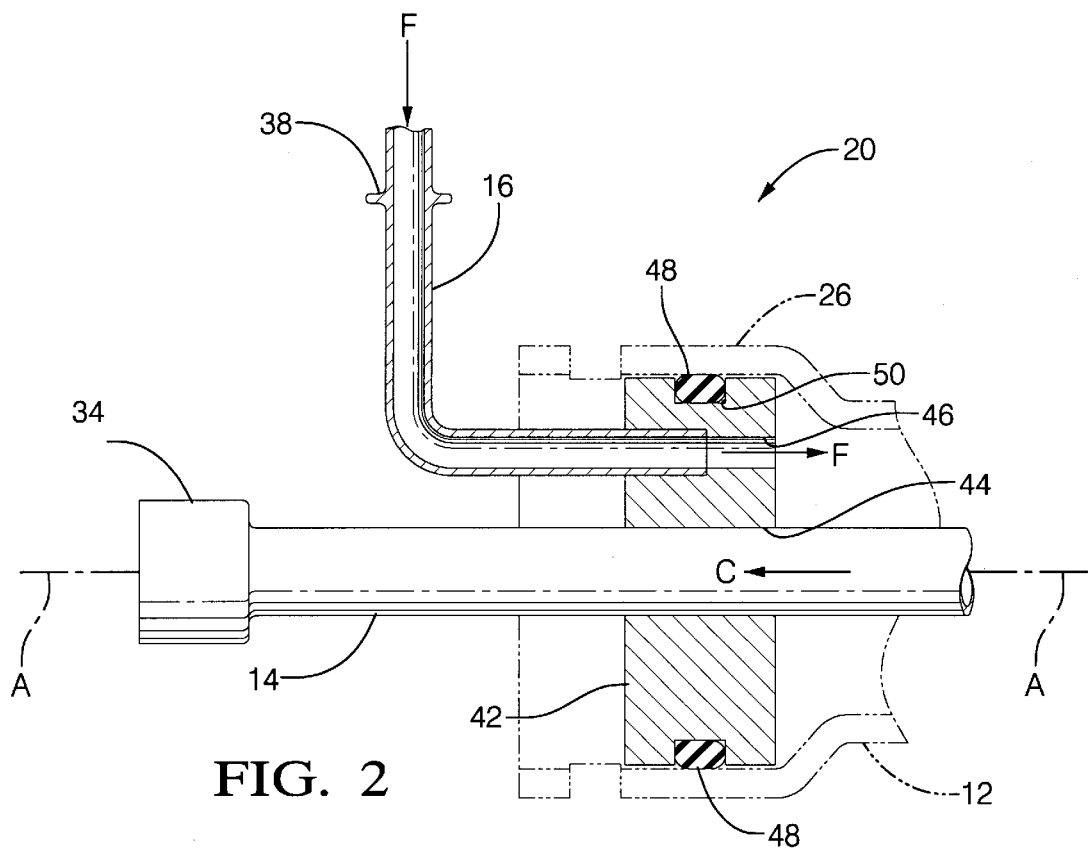
FIG. 2 is cutaway, detail view of the inlet end plug subassembly of FIG. 1.

Referring now to FIG. 2, inlet end plug assembly 20 includes inlet end plug body 42, coolant conduit 14, fuel inlet 16 and inlet end plug O-ring or gasket 48. Inlet end plug assembly 20 is sealingly received within flange portion 26 of fuel conduit 12. Inlet end plug body 42 is constructed of, for example, an engineering polymer, a brazed anodized aluminum, stainless steel, or plated steel material. Inlet end plug body 42 defines a first bore 44 therethrough, through which coolant conduit 14 passes. Inlet end plug body 42 defines a second bore 46 therethrough, at least partially into which fuel inlet 16 extends. Coolant conduit 14 is attached by, for example, brazing to inlet end plug body 42. Fuel inlet 16 is also attached by, for example, brazing to end plug body 42. Inlet end plug O-ring or gasket 48 seals inlet end plug assembly 20 and flange portion 28 of fuel conduit 12 together in an air and fuel tight manner, thereby preventing the escape of fuel from or the entrance of unwanted air into fuel conduit 12. Seat 50 is formed around the circumference of inlet end plug body 42 to receive and retain inlet end plug O-ring or gasket 48. Inlet end plug assembly 20 is retained within flange portion 28 of fuel conduit 12 by, for example, a hair pin clip or a band clamp (not shown).

Figure 3:
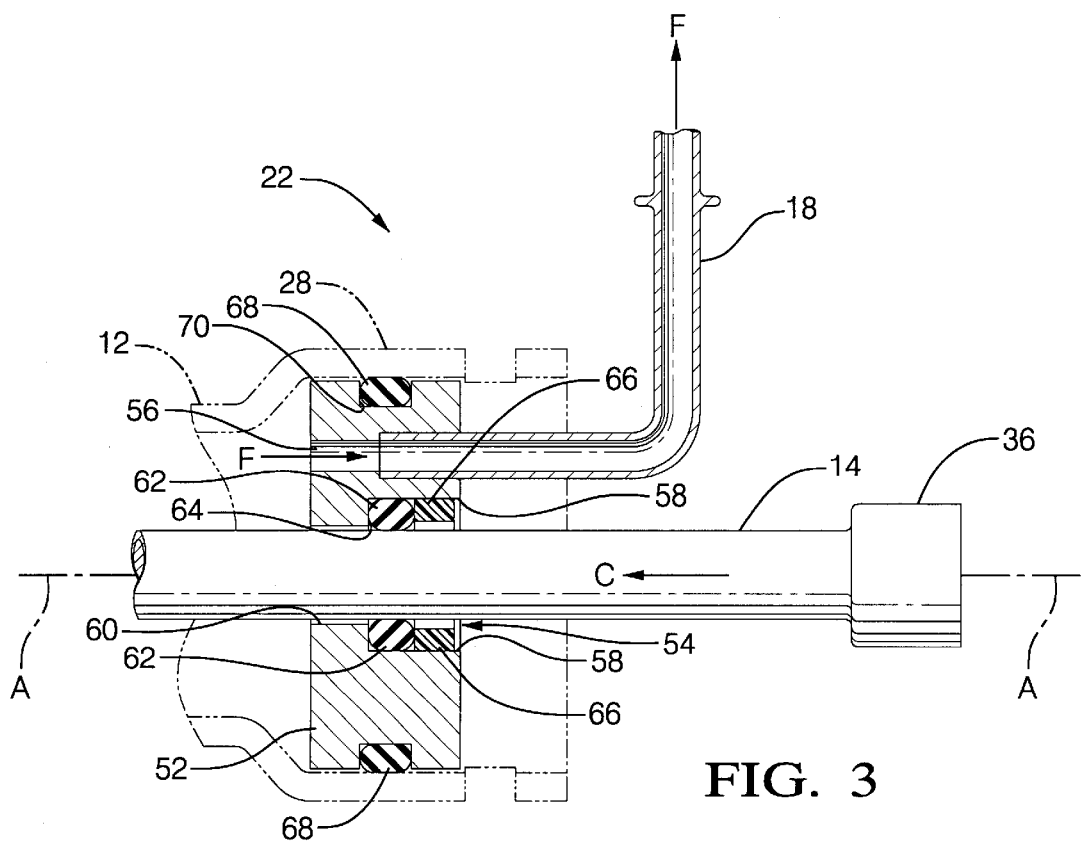
FIG. 3 is a cutaway, detail view of the outlet end plug subassembly of FIG. 1.

Referring now to FIG. 3, outlet end plug assembly 22 includes outlet end plug body 52, fuel outlet 18, coolant conduit O-ring or gasket 62, retaining ring 66, and outlet end plug O-ring or gasket 68. Outlet end plug assembly 22 is sealingly received within flange portion 28 of fuel conduit 12. Outlet end plug body 52 is constructed of, for example, an engineering polymer, a brazed anodized aluminum, stainless steel, or plated steel material. Outlet end plug body 52 defines a first bore 54 therethrough, through which coolant conduit 14 passes. Outlet end plug body 52 defines a second bore 56 therethrough, at least partially into which fuel outlet 18 extends. Fuel outlet 18 is attached by, for example, brazing to outlet end plug body 52. First bore 54 includes a wide portion 58 which extends a predetermined distance from the outside surface of outlet end plug body 52 inward relative to fuel conduit 12. A narrow portion 60 of first bore 54 extends a predetermined distance outward relative to fuel conduit 12 from the inside surface of outlet end plug body 52 and joins with wide portion 58 of first bore 54. A coolant conduit O-ring or gasket 62 is seated at the interface or step 64 formed at the point where narrow portion 60 and wide portion 58 of first bore 54 meet. Step 64 prevents coolant conduit O-ring or gasket 62 from being pushed or otherwise drawn into fuel conduit 12. Coolant conduit O-ring or gasket 62 seals coolant conduit 14 and body 52 together in an air and fuel tight manner, thereby preventing the escape of fuel from or the entrance of unwanted air into fuel conduit 12.

Coolant conduit 14, being attached to body 42 of inlet end plug assembly 20 and being sealed to outlet end plug body 52 by coolant conduit O-ring or gasket 62, does not necessarily have to be attached to outlet end plug body 52, thereby yielding benefits in the assembly of coaxial liquid cooled fuel rail assembly 10 which are discussed hereinafter.

Coolant conduit O-ring or gasket 62 is formed of, for example, rubber. Retaining ring 66 is disposed within wide portion 58 of first bore 54 and prevents the outward displacement of coolant conduit O-ring or gasket 62. Retaining ring 66 is, for example, a spring clip or C-clip, and is formed of a suitable metal or plastic. Outlet end plug assembly 22 further includes an outlet end plug O-ring or gasket 68 which seals outlet end plug assembly 22 and flange portion 28 of fuel conduit 12 together in an air and fuel tight manner, thereby preventing the escape of fuel from or the entrance of unwanted air into fuel conduit 12. Seat 70 is formed around the circumference of body 52 to receive and retain outlet end plug O-ring or gasket 68. Outlet end plug assembly 22 is retained within flange portion 28 of fuel conduit 12 by, for example, a hair pin clip or a band clamp (not shown).

In use, fuel is pumped under low pressure from a fuel tank (not shown) to a vapor separator (not shown) having a high pressure fuel pump (not shown) associated therewith. The fuel is then pumped under high pressure through fuel inlet 16 and into fuel conduit 12 by the high pressure fuel pump. The fuel flows through the length of fuel conduit 12 in the direction indicated by arrow F. Any excess fuel exits fuel conduit 12 through fuel outlet 18 and is returned to the fuel supply system. Heat, generated by the high pressure fuel pump, the engine on which liquid cooled coaxial fuel rail assembly 10 is installed and surrounding components is transferred to liquid cooled coaxial fuel rail assembly 10. More particularly, fuel conduit 12, being disposed on the outside of liquid cooled coaxial fuel rail assembly 10, is most directly exposed to and will absorb at least a portion of the ambient heat. However, most preferably, fuel conduit 12 is constructed of an insulating material such as, for example, 33% glass filled Nylon 66, and therefore absorbs only a fraction of that ambient heat.

At least a portion of the heat transferred to fuel conduit 12 will, in turn, be transferred to the fuel contained therein. Accordingly, the temperature of the fuel within fuel conduit 12 will be increased. The increased fuel temperature can result in difficulty in restarting the engine and render the combustion process less efficient. To cool the fuel within fuel conduit 12, coolant is pumped through coolant conduit 14. As the coolant flows through coolant conduit 14, the heat absorbed by fuel conduit 12 and the fuel contained therein is transferred to the coolant. The coolant flows through coolant conduit 14 in the direction indicated by arrow C. The direction of coolant flow C is opposite to the direction of fuel flow F. The opposing directions of flow for the coolant and the fuel increases the efficiency of heat transfer therebetween. The coolant is flowed at a predetermined velocity, which is selected to maximize the efficiency of heat transfer for a given coolant pump and coolant tubing configuration.

Assembly of coaxial liquid cooled fuel rail 10 can be accomplished in various ways. In the first method, inlet end plug assembly 20 and outlet end plug assembly 22 are first assembled. More particularly, assembly of inlet end plug assembly 20 is accomplished by inserting fuel inlet 16 at least partially into bore 46 of inlet end plug body 42. Fuel inlet 16 is then attached by, for example, brazing or epoxy, to inlet end plug body 42. Similarly, coolant conduit 14 is inserted through bore 44 of inlet end plug body 42 and then attached by, for example, brazing thereto. Assembly of outlet end plug assembly 22 is accomplished by inserting fuel outlet 18 at least partially into bore 56 of outlet end plug body 52. Fuel outlet 18 is then attached by, for example, brazing or epoxy, to outlet end plug body 52. Inlet end plug assembly 20 is then assembled together with fuel conduit 12 by inserting inlet end plug assembly 20 (which now carries coolant conduit 14 and fuel inlet 16) into flange portion 26 of fuel conduit 12 such that coolant conduit 14 and fuel conduit 12 are coaxial. Inlet end plug O-ring 48 seals inlet end plug assembly 20 and fuel conduit 12 together in an air and fuel tight manner. A hair pin or ring clamp (not shown) is inserted into slots 33a to secure inlet end plug assembly 20 in position relative to fuel conduit 12. The assembly of coaxial liquid cooled fuel rail 10 is then completed by assembling outlet end plug assembly 22 together with fuel conduit 12. More particularly, outlet end plug assembly 22 is inserted into flange portion 28 of fuel conduit 12 such that the portion of coolant conduit 14 extending from the open end of fuel conduit 12 passes through bore 54 in outlet end plug body 52. Coolant conduit O-ring 62 of outlet end plug assembly 22 forms a seal between outlet end plug body 52 and coolant conduit 14, and end plug O-ring 68 forms a seal between outlet end plug body 52 and fuel conduit 12. A hair pin or ring clamp (not shown) is inserted into slots 33b and secures outlet end plug assembly 22 in position relative to fuel conduit 12.

Alternatively, liquid cooled coaxial fuel rail assembly 10 may be assembled without the benefit of first assembling the respective inlet and outlet end plug assemblies. In this method, inlet end plug body 42 is pressed into flange portion 26 of fuel conduit 12. Coolant conduit 14 is then inserted through bore 44 in body 42 and is attached thereto by, for example, brazing or epoxy. Outlet end plug body 52 is then pressed into flange portion 28 of fuel conduit 12 such that the end of coolant conduit 14 extending from the open end of fuel conduit 12 passes through bore 54 in body 52, thereby assuring coolant conduit 14 and fuel conduit 12 are coaxial. Assembly of liquid cooled coaxial fuel rail assembly 10 is then completed by inserting fuel inlet tube 16 and fuel outlet tube 18 into bores 46 and 56 of bodies 42 and 52, respectively. Fuel inlet tube 16 and fuel outlet tube 18 are then attached to body 42 and body 52, respectively, by, for example, brazing or epoxy. Bodies 42 and 52 are then secured to fuel conduit 12 by, for example, hair pins or ring clamps which are inserted into slots 33a and 33b, respectively.

In the embodiment shown, fuel conduit 12 is molded from a synthetic material such as, for example, 33% glass filled nylon 66 having a low thermal conductivity of approximately 0.2 Watts per meter per degree Celsius, thereby minimizing the absorption of heat by fuel conduit 12 from its ambient environment. It is to be understood, however, that fuel conduit 12 can be constructed of other engineering polymers, such as, for example, a different polyamide, polyphthalamide, polyphenylene sulfide, or phenolic, having an acceptable thermal conductivity for the given application. Furthermore, it is to be understood that fuel conduit 12 may be constructed of, for example, stainless steel, plated steel, aluminum tubing, or other suitable material having a relatively low mass and acceptable thermal conductivity. Fuel conduit 12 is, in the embodiment shown, formed with one mounting boss 32. It is to be understood, however, that fuel conduit 12 can be alternately configured with several mounting bosses of various sizes and shapes as dictated by the application. In the embodiment shown, fuel conduit 12 is formed with slots 33a and 33b which receive a mechanical retaining device such as a ring clamp or hair pin. It is to be understood, however, that fuel conduit 12 may be formed without slots and that alternate mechanical retaining devices may be used.

In the embodiment shown, coolant conduit 14 extends through the entire length of fuel conduit 12. However, it is to be understood that coolant conduit 14 can be alternately configured to extend through only a portion of coolant conduit 14 and still achieve its intended purpose of cooling the fuel contained within fuel conduit 12. In the embodiment shown, coolant conduit 14 enters and exits fuel conduit 12 at the ends thereof. However, it is to be understood that coolant conduit 14 could enter and exit at virtually any point along the length of fuel conduit 12, and that the points of entry and exit of coolant conduit 14 into and out of fuel conduit 12 are merely choices of design. Furthermore, in the embodiment shown, fuel conduit 12 has open ends. However, it is to be understood that fuel conduit 12 could be formed with closed ends which integrally define the bores for coolant conduit 14, the fuel inlet 16 and fuel outlet 18.

Moreover, in the embodiment shown, fuel conduit 12 and coolant conduit 14 are elongate tubular members. However, it is to be understood that both fuel conduit 12 and coolant conduit 14 can vary from this geometry and still perform their intended functions of carrying fuel and coolant, respectively. For example, cooling conduit 14 may include fins to increase the surface area available for heat transfer. As a further example, cooling conduit 14 can be alternately configured as a coiled tubular member, thereby further increasing the surface area available for heat transfer. Yet further, fuel conduit 12 and cooling conduit 14 can be configured as square or triangular tubular members.

In the embodiment shown, fuel conduit 12 and coolant conduit 14 are coaxial. However, it is to be understood that fuel conduit 12 and coolant conduit 14 can be alternatively configured as parallel members, so long as a portion of coolant conduit 14 passes through and is surrounded by fuel conduit 12. For example, coolant conduit 14 may be disposed within and surrounded by fuel conduit 12 such that coolant conduit 14 is off-center relative to and not coaxial with fuel conduit 12.

In the embodiment shown, inlet end plug assembly 20 and outlet end plug assembly 22 are sealingly received within a respective one of flange portions 26 and 28 of fuel conduit 12. However, it is to be understood that inlet end plug assembly 20 and outlet end plug assembly 22 may be inserted into a respective one of flange portions 26 and 28 and sealed therein through alternate means such as, for example, welding or epoxy. Furthermore, in the embodiment shown, fuel conduit 12 is formed with flange portions 26 and 28. It is to be understood that fuel conduit 12 may be alternately formed such as, for example, without flanges.

In the embodiment shown, the direction of coolant flow C is opposite to the direction of fuel flow F. However, it is to be understood that the directions of coolant flow and fuel flow may be alternately configured and still achieve the objects of the invention.

While this invention has been described as having a preferred design, the present invention can be further modified within the spirit and scope of this disclosure. This application is therefore intended to cover any variations, uses, or adaptations of the present invention using the general principles disclosed herein. Further, this application is intended to cover such departures from the present disclosure as come within the known or customary practice in the art to which this invention pertains and which fall within the limits of the appended claims.

What is claimed:

1. A liquid cooled fuel rail assembly, comprising:
   an elongate tubular fuel conduit having a longitudinal central axis and a first diameter, said fuel conduit being configured for carrying fuel, said fuel conduit defining at least one port, each of said at least one port being configured for receiving an intake end of a corresponding fuel injector;
   a fuel inlet in fluid communication with said fuel conduit;
   a fuel outlet in fluid communication with said fuel conduit; and
   an elongate tubular coolant conduit having a second diameter, said second diameter being less than said first diameter of said fuel conduit, at least a first segment of said coolant conduit being disposed entirely within and surrounded by said fuel conduit, said coolant conduit being configured for carrying coolant.

2. The liquid cooled fuel rail assembly of claim 1, wherein a substantial portion of said first segment of said coolant conduit is substantially parallel with said longitudinal axis of said fuel conduit.

3. The liquid cooled fuel rail assembly of claim 1, wherein a substantial portion of said first segment of said coolant conduit is substantially coaxial relative to said longitudinal central axis of said fuel conduit.

4. The liquid cooled fuel rail assembly of claim 1, wherein fuel flows through said fuel conduit in a first direction and coolant flows through said coolant conduit in a second direction, said first direction being opposite to said second direction.

5. The liquid cooled fuel rail assembly of claim 1, wherein said fuel conduit is constructed of a lightweight, composite material having a low thermal conductivity.

6. The liquid cooled fuel rail assembly of claim 5, wherein said composite material comprises at least one of a polyamide, polyphthalamide, polyphenylene suflide, and phenolic.

7. The liquid cooled fuel rail assembly of claim 1, wherein said fuel conduit is constructed of at least one of stainless steel, plated steel and aluminum.

8. A liquid cooled fuel rail assembly, comprising:
   an elongate tubular fuel conduit having a longitudinal central axis, a first diameter, a first end and a second end, said fuel conduit being configured for carrying fuel and defining at least one port, each of said at least one port being configured for receiving an intake end of a corresponding fuel injector;
   a first end plug associated with said first end of said fuel conduit, said first end plug defining a first bore and a second bore therethrough, said first end plug configured for sealing said first end of said fuel conduit;
   a second end plug associated with said second end of said fuel conduit, said second end plug defining a first bore and a second bore therethrough, said second end plug configured for sealing said second end of said fuel conduit;
   a fuel inlet in fluid communication with said second bore of said first end plug;
   a fuel outlet in fluid communication with said second bore of said second end plug; and
   an elongate tubular coolant conduit having a second diameter, said second diameter being less than said first diameter of said fuel conduit a first segment of said coolant conduit being disposed entirely within and surrounded by said fuel conduit, said coolant conduit extending through said first bore defined by said first end plug and said first bore defined by said second end plug, said coolant conduit being configured for carrying coolant.

9. The liquid cooled fuel rail assembly of claim 8, wherein said first segment of said coolant conduit is substantially parallel with said longitudinal central axis of said fuel conduit.

10. The liquid cooled fuel rail assembly of claim 8, wherein said first segment of said coolant conduit is substantially coaxial with said longitudinal central axis of said fuel conduit.

11. The liquid cooled fuel rail assembly of claim 8, wherein fuel flows through said fuel conduit in a first direction and coolant flows through said coolant conduit in a second direction, said first direction being opposite to said second direction.

12. The liquid cooled fuel rail assembly of claim 8, wherein said fuel conduit is constructed of a lightweight composite material having a low thermal conductivity.

13. The liquid cooled fuel rail assembly of claim 12, wherein said composite material comprises at least one of a polyamide, polyphthalamide, polyphenylene suflide, and phenolic.

14. The liquid cooled fuel rail assembly of claim 8, wherein said fuel conduit is constructed of at least one of stainless steel, plated steel and aluminum.

15. The liquid cooled fuel rail assembly of claim 8, wherein said first end plug is sealingly received within said first end of said fuel conduit and said second end plug is sealingly received within said second end of said fuel conduit.

16. The liquid cooled fuel rail assembly of claim 15, wherein each of said first and second end plugs include a respective gasket disposed around a respective circumference thereof.

17. The liquid cooled fuel rail assembly of claim 16, wherein each of said first and said second end plugs include a circumferentially disposed recess, each said recess receiving a portion of one of a respective said gasket.

18. The liquid cooled fuel rail assembly of claim 16, wherein at least one of said first end plug and said second end plug includes a gasket disposed within a respective said second bore.

19. The liquid cooled fuel rail assembly of claim 16, wherein each of said first end and said second end of said fuel conduit defines a flange, each respective said flange having a third diameter, said third diameter being greater than said first diameter of said fuel conduit, each respective said flange configured for sealingly receiving a corresponding one of said first end plug and said second end plug.

20. The liquid cooled fuel rail assembly of claim 8, wherein at least one of said fuel inlet and said coolant conduit is attached to said first end plug.

21. The liquid cooled fuel rail assembly of claim 8, wherein at least one of said fuel outlet and said coolant conduit is attached to said second end plug.

22. The liquid cooled fuel rail assembly of claim 8, wherein at least one of said first end plug and said second end plug is attached to said fuel conduit.

23. The liquid cooled fuel rail assembly of claim 8, wherein at least one of said first end plug and said second end plug is integral with said fuel conduit.

24. An inlet subassembly for a liquid cooled fuel rail, comprising:
   an inlet end plug defining a fuel inlet bore and a coolant conduit bore therethrough, said inlet end plug configured for being sealingly received within a fuel conduit;
   a fuel inlet in fluid communication with said fuel inlet bore, said fuel inlet being attached to said inlet end plug; and
   a coolant conduit passing through said coolant conduit bore and being attached to said inlet end plug.

25. An outlet subassembly for a liquid cooled fuel rail, comprising
   an outlet end plug defining a fuel outlet bore and a coolant conduit bore therethrough, said outlet end plug configured for being sealingly received within a fuel conduit; and
   a fuel outlet in fluid communication with said fuel outlet bore, said fuel outlet being attached to said outlet end plug.

26. A fuel injected internal combustion engine, comprising:
   a fuel conduit having a longitudinal central axis and a first diameter, said fuel conduit being configured for carrying fuel, said fuel conduit defining at least one port, each of said at least one port being configured for receiving an intake end of a corresponding fuel injector;
   a fuel inlet in fluid communication with said fuel conduit;
   a fuel outlet in fluid communication with said fuel conduit; and
   an elongate, tubular coolant conduit having a second diameter, said second diameter being less than said first diameter of said fuel conduit, at least a first segment of said coolant conduit being disposed entirely within and surrounded by said fuel conduit, said coolant conduit being configured for carrying coolant.

27. The fuel injected internal combustion engine of claim 26, wherein a substantial portion of said first segment of said coolant conduit is substantially parallel with said longitudinal axis of said fuel conduit.

28. The fuel injected internal combustion engine of claim 26, wherein a substantial portion of said first segment of said coolant conduit is substantially coaxial with said fuel conduit.

29. The fuel injected internal combustion engine of claim 26, wherein fuel flows through said fuel conduit in a first direction and coolant flows through said coolant conduit in a second direction, said first direction being opposite to said second direction.

30. The fuel injected internal combustion engine of claim 26, wherein said fuel conduit is constructed of a lightweight composite material having a low thermal conductivity.

31. The fuel injected internal combustion engine of claim 30, wherein said composite material comprises at least one of a polyamide, polyphthalamide, polyphenylene suflide, and phenolic.

* * * * *